United States Patent
Petersen et al.

(10) Patent No.: US 10,103,366 B2
(45) Date of Patent: Oct. 16, 2018

(54) BATTERY ARRAY INCLUDING INTEGRATED LIFTING FEATURES

(71) Applicant: FORD GLOBAL TECHNOLOGIES, LLC, Dearborn, MI (US)

(72) Inventors: Peter Eric Petersen, Royal Oak, MI (US); Brian Utley, Canton, MI (US); David Moschet, Dearborn, MI (US); Jason Luesing, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 98 days.

(21) Appl. No.: 14/696,664

(22) Filed: Apr. 27, 2015

(65) Prior Publication Data

US 2016/0315300 A1    Oct. 27, 2016

(51) Int. Cl.
*H01M 2/10* (2006.01)

(52) U.S. Cl.
CPC ...... *H01M 2/1077* (2013.01); *H01M 2220/20* (2013.01)

(58) Field of Classification Search
CPC ............ H01M 2/1083; H01M 2/1077; H01M 2220/20
See application file for complete search history.

(56) References Cited

U.S. PATENT DOCUMENTS

| | | | |
|---|---|---|---|
| 2010/0275564 A1* | 11/2010 | Baetica | A01D 34/78 56/11.9 |
| 2012/0100399 A1* | 4/2012 | Adachi | B60L 11/18 429/7 |
| 2012/0244404 A1* | 9/2012 | Obasih | B60L 3/0046 429/99 |
| 2013/0288096 A1* | 10/2013 | Frutschy | H01M 2/1088 429/99 |
| 2016/0197323 A1* | 7/2016 | DeKeuster | H01M 2/305 429/82 |

* cited by examiner

*Primary Examiner* — Muhammad S Siddiquee
(74) *Attorney, Agent, or Firm* — Carlson, Gaskey & Olds (57) ABSTRACT

A battery array according to an exemplary aspect of the present disclosure includes, among other things, a plurality of battery cells, a support structure surrounding the plurality of battery cells and a first lifting feature protruding from a first wall of the support structure.

18 Claims, 6 Drawing Sheets

BATTERY ARRAY INCLUDING INTEGRATED LIFTING FEATURES

TECHNICAL FIELD

This disclosure relates to a battery array for an electrified vehicle. The battery array includes one or more lifting features integrated into a support structure of the battery array. The lifting features are configured to receive a lifting tool for lifting, handling and maneuvering the battery array.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

The powertrain of an electrified vehicle is typically equipped with a battery assembly including a plurality of battery cells that store electric power for powering the electric machines and other electric loads of the electrified vehicle. A support structure (i.e., end walls, side walls, etc.) generally surrounds the battery cells to build a battery array. Some form of a lifting feature is typically required for handling the battery array during the assembly and packaging portions of the manufacturing process.

SUMMARY

A battery array according to an exemplary aspect of the present disclosure includes, among other things, a plurality of battery cells, a support structure surrounding the plurality of battery cells and a first lifting feature protruding from a first wall of the support structure.

In a further non-limiting embodiment of the foregoing battery array, the first wall is an end wall of the support structure.

In a further non-limiting embodiment of either of the foregoing battery arrays, the first wall includes an outer shell and an inner shell, and the first lifting feature includes a tab that protrudes from the outer shell.

In a further non-limiting embodiment of any of the foregoing battery arrays, a bent portion of the tab extends above the inner shell.

In a further non-limiting embodiment of any of the foregoing battery arrays, the inner shell includes at least one through-hole extending vertically through the inner shell.

In a further non-limiting embodiment of any of the foregoing battery arrays, a retention bar extends over top of the plurality of battery cells and connects to the tab.

In a further non-limiting embodiment of any of the foregoing battery arrays, the tab and the retention bar together establish the first lifting feature.

In a further non-limiting embodiment of any of the foregoing battery arrays, a slot extends between the tab and the inner shell.

In a further non-limiting embodiment of any of the foregoing battery arrays, the first lifting feature includes a tab that protrudes outwardly from an outer face of the first wall in a direction opposite from the plurality of battery cells.

In a further non-limiting embodiment of any of the foregoing battery arrays, the tab includes a slot.

In a further non-limiting embodiment of any of the foregoing battery arrays, the slot is configured to receive a lifting tool.

In a further non-limiting embodiment of any of the foregoing battery arrays, an outermost face of the tab is an outermost surface of the first wall.

In a further non-limiting embodiment of any of the foregoing battery arrays, the lifting feature includes a tab that is integrated as part of the support structure.

In a further non-limiting embodiment of any of the foregoing battery arrays, a second lifting feature protrudes from a second wall of the support structure, the second wall on an opposite end of the plurality of battery cells from the first wall.

In a further non-limiting embodiment of any of the foregoing battery arrays, the first lifting feature includes a slot configured to receive a lifting tool.

A method according to another exemplary aspect of the present disclosure includes, among other things, approaching a battery array from its top side with a lifting tool, engaging a lifting feature of a battery array using the lifting tool and moving the battery array by moving the lifting tool.

In a further non-limiting embodiment of the foregoing method, the engaging step excludes moving any portion of the lifting tool beyond an outer peripheral envelope of the battery array.

In a further non-limiting embodiment of either of the foregoing methods, the engaging step includes inserting a stationary leg of the lifting tool into a through-hole of a wall of the battery array and moving a movable leg into engagement with the lifting feature.

In a further non-limiting embodiment of any of the foregoing methods, the step of moving the movable leg includes one of translating the movable leg relative to a body of the lifting tool or pivoting the movable leg relative to the body.

In a further non-limiting embodiment of any of the foregoing methods, the lifting feature includes a tab that protrudes outwardly from a wall of the battery array and the engaging step includes inserting the lifting tool through a slot of the tab and engaging a leg of the lifting tool with a portion of the tab that surrounds a periphery of the slot.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a battery array for an electrified vehicle. The battery array may employ one or more lifting features configured to receive a lifting tool. The lifting tool engages the lifting feature to lift, handle and/or maneuver the battery array during assembly and packaging processes. The lifting features are integrated as part of a support structure and therefore require minimal additional materials by utilizing structures that are already part of the battery array. In some embodiments, the lifting feature includes a tab that protrudes from the wall. A portion of the tab may be engaged by the lifting tool for handling the battery array. These and other features are discussed in greater detail in the following paragraphs of this detailed description.

Figure 1:
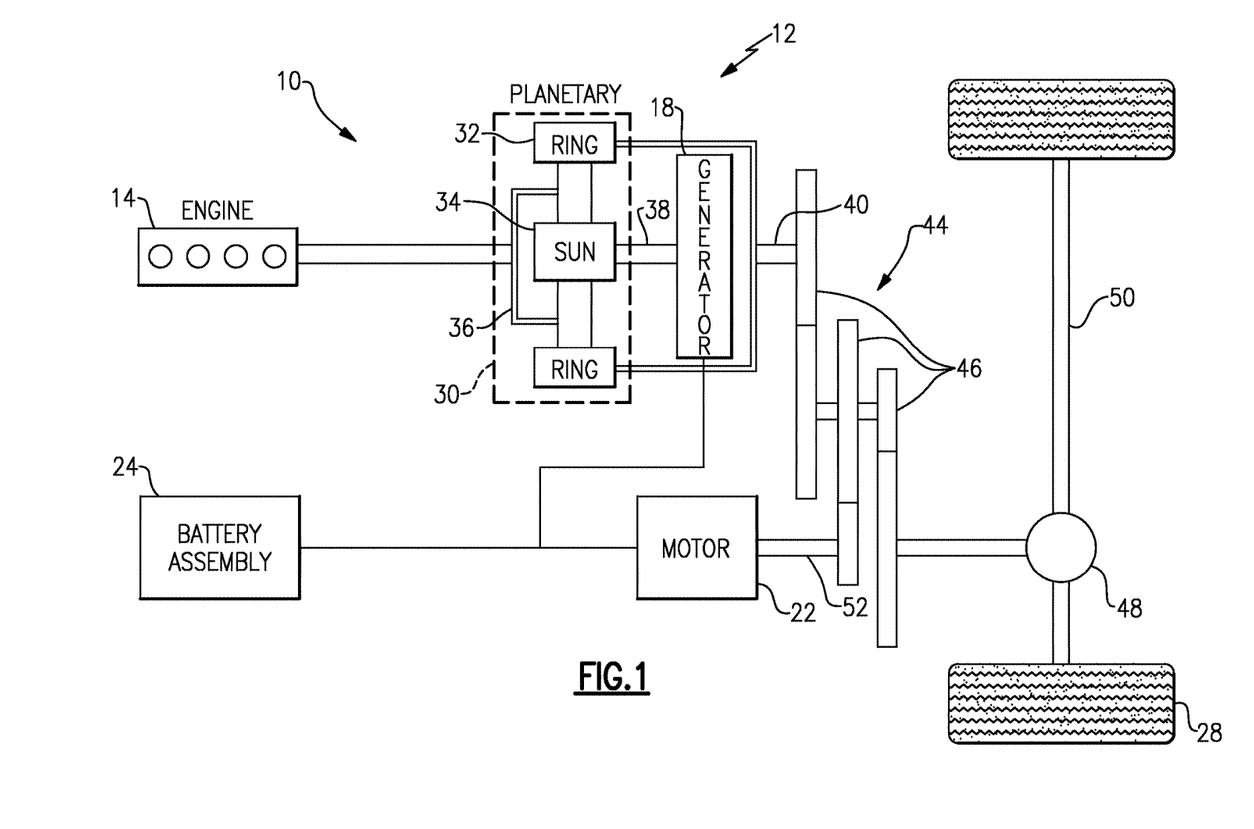
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may include a high voltage traction battery pack that includes a plurality of battery arrays capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion. The electrified vehicle 12 may be operated in other operating modes in addition to the EV and HEV modes within the scope of this disclosure.

Figure 2:
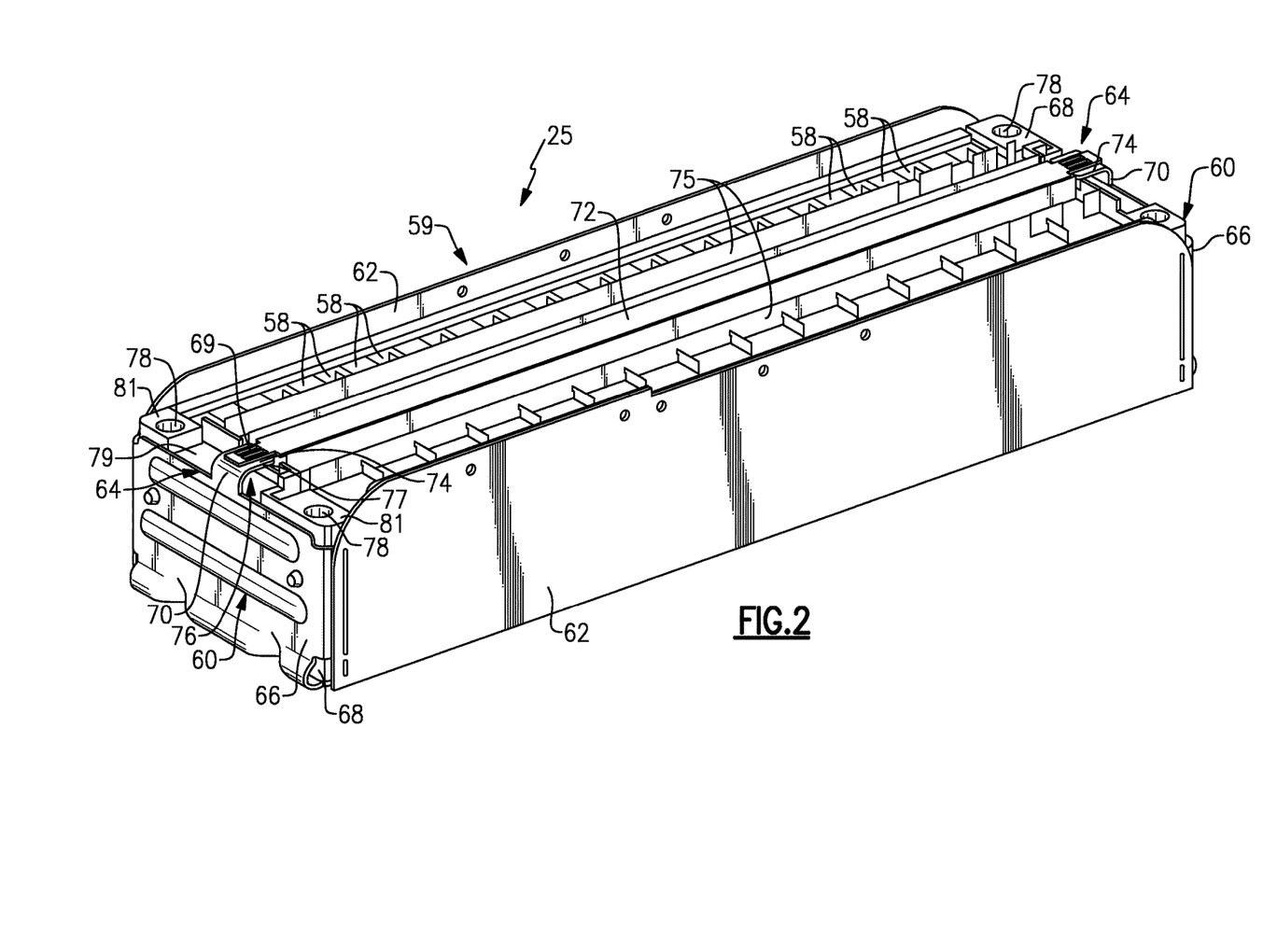
FIG. 2 illustrates a battery array according to a first embodiment of this disclosure.
Figure 3:
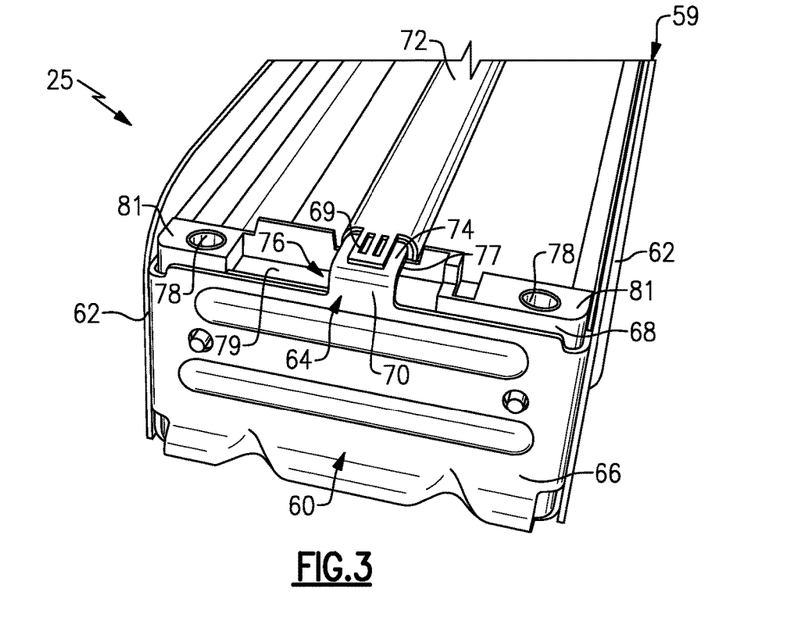
FIG. 3 illustrates a portion of the battery array of FIG. 2.

FIGS. 2 and 3 illustrate a battery array 25 that can be incorporated into an electrified vehicle. For example, the battery array 25 could be part of the battery assembly 24 of the electrified vehicle 12 of FIG. 1. The battery array 25 includes a plurality of battery cells 58 for supplying electrical power to various components of the electrified vehicle 12. Although a specific number of battery cells 58 are illustrated in FIG. 2, the battery array 25 could include a greater or fewer number of battery cells within the scope of this disclosure. In other words, this disclosure is not limited to the specific configuration shown in these figures.

The battery cells 58 may be stacked side-by-side to construct a grouping of battery cells, sometimes referred to as a "cell stack." In one embodiment, the battery cells 58 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

A support structure 59, sometimes referred to as an array structure or array support structure, generally surrounds the battery cells 58. The support structure 59 may include opposing end walls 60 disposed at the longitudinal extents of the grouping of battery cells 58 and opposing side walls 62 that extend on both sides of the battery array 25 between the opposing end walls 60. The end walls 60 and the side walls 62 cooperate to hold the battery cells 58 under compression relative to one another. The side walls 62 may be connected to the end walls 60 in any known manner. In one non-limiting embodiment, the side walls 62 and the end walls 60 are welded together. In another non-limiting embodiment, the support structure 59 includes a monoblock design that includes a single, contiguous unit that generally surrounds the battery cells 58.

The support structure 59 may additionally include a retention bar 72 and one or more bus bar modules 75. The retention bar 72 may optionally extend over top of the battery cells 58 of the battery array 25 for retaining the battery cells 58 and to provide rigidity to the battery array 25. The bus bar modules 75 may rest on top of the battery cells 58 and may receive metallic bus bars (not shown) for electrically connecting the battery cells 58.

The battery array 25 may additionally employ one or more lifting features 64 that are integrated as part of the support structure 59. The lifting features 64 are configured to receive lifting tools, examples of which are discussed below, that engage the lifting features 64 to lift, handle and/or move the battery array 25. For example, lifting tools may be utilized to engage the lifting features 64 during the array or packaging portions of a battery array manufacturing process. In one non-limiting embodiment, the lifting features 64 protrude from the end walls 60 of the support structure 59. However, other configurations are also contemplated, including configurations in which the lifting features 64 are integrated into the side walls 62 or any other portion of the support structure 59.

In one non-limiting embodiment, each end wall 60 exhibits a two-piece design. For example, each end wall 60 may include an outer shell 66 and an inner shell 68 connected to the outer shell 66. The inner shell 68 is disposed between the outer shell 66 and the battery cells 58. The outer shell 66 may be a stamped, metallic portion of the end wall 60, and the inner shell 68 may be a plastic portion of the end wall 60.

In one non-limiting embodiment, the lifting feature 64 of each end wall 60 of the battery array 25 includes a tab 70. The tab 70 may protrude upwardly from the outer shell 66 such that it extends in an opposite direction from the bottom of the battery array 25. The tab 70 may include a bent portion 74 that extends in a direction toward the opposite end wall 60. The retention bar 72 may connect to the tab 70. In one non-limiting embodiment, a tab 69 of the retention bar 72 is welded to the bent portion 74 of the tab 70. A slot 76 may extend between an underside 77 of the bent portion 74 of the tab 70 and a top face 79 of the inner shell 68. Together, the tab 70 and the retention bar 72 establish the lifting feature 64 of each end of the battery array 25. A lifting tool may be received within the slot 76 and then moved to engage the underside 77 of the bent portion 74 in order to lift and move the battery array 25, as further discussed below.

One or more through-holes 78 may be formed through the inner shell 68 of each end wall 60. In one embodiment, the through-holes 78 extend vertically across the height of the inner shells 68. The through-holes 78 may be positioned within opposing side portions 81 of the inner shell 68. The opposing side portions 81 are disposed near the junction between each end wall 60 and the side walls 62.

Figure 4A:
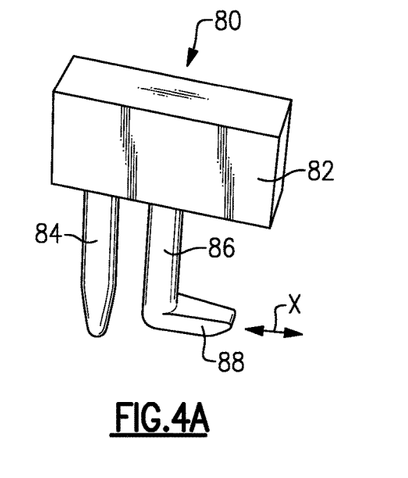
FIG. 4A illustrates a lifting tool according to a first embodiment of this disclosure.
Figure 4B:
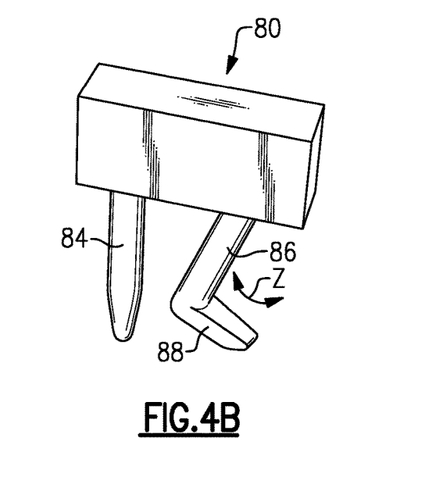
FIG. 4B illustrates a lifting tool according to a second embodiment of this disclosure.

FIGS. 4A and 4B illustrate an exemplary lifting tool 80. The lifting tool 80 includes a body 82, a stationary leg 84 and a movable leg 86. The stationary leg 84 and the movable leg 86 both extend from the body 82. The stationary leg 84 is substantially immovable relative to the body 82, whereas the movable leg 86 may be translated or pivoted relative to the body 82. In one embodiment, the movable leg 86 may be translated along a length of the body 82 as schematically illustrated by arrow X (see FIG. 4A). In another embodiment, the movable leg 86 may be pivoted or swung relative to the body 82 as schematically illustrated by arrow Z (see FIG. 4B). An engagement member 88 may extend transversely from the movable leg 86 of the lifting tool 80.

Figure 5A:
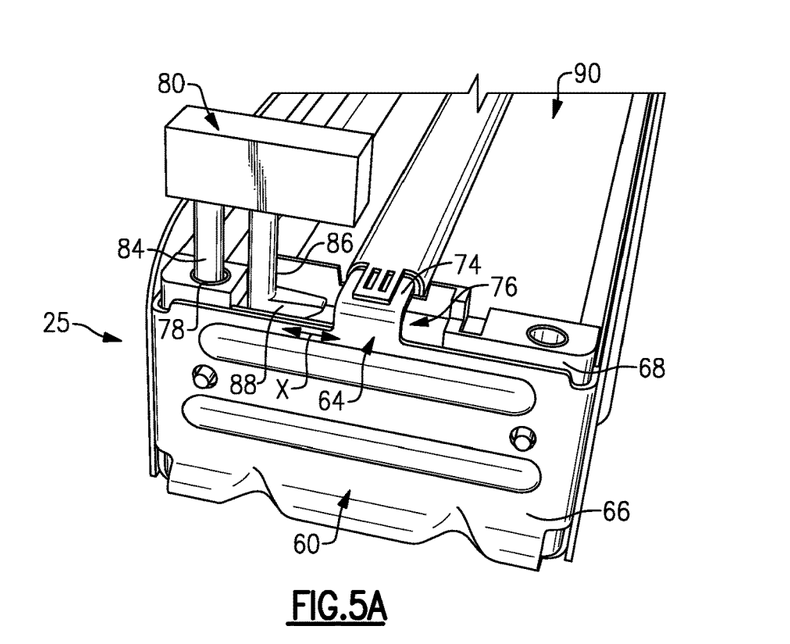
FIGS. 5A, 5B and 5C schematically illustrate engagement of a lifting feature with a lifting tool for lifting and moving a battery array.
Figure 5B:
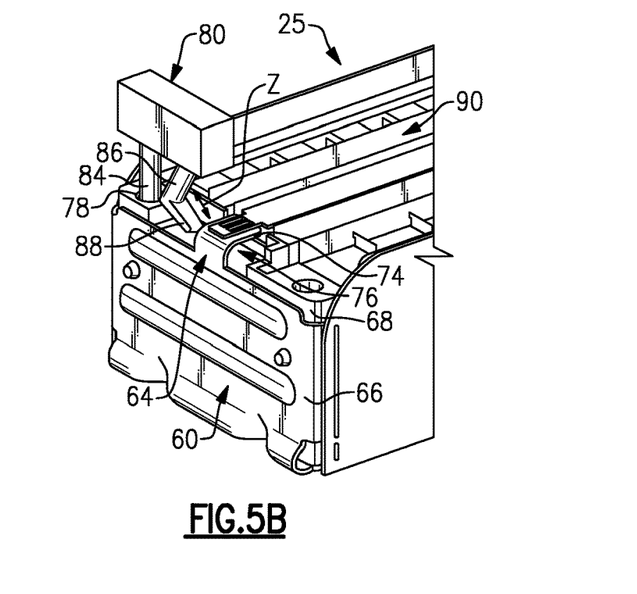
Figure 5C:
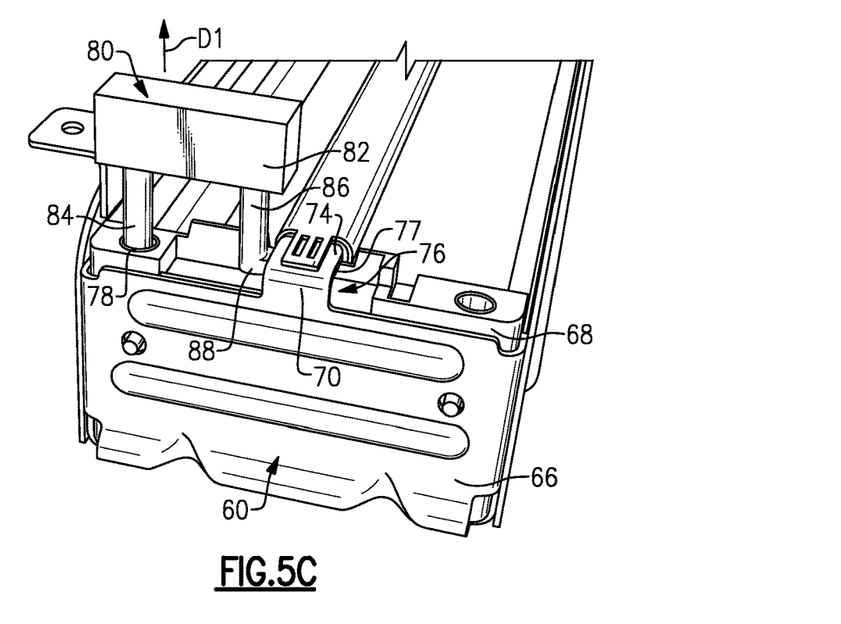

Referring now to FIGS. 5A, 5B and 5C, with continued reference to FIGS. 1-4B, the lifting tool 80 may be used to lift and move the battery array 25 during portions of the battery array manufacturing process. First, the lifting tool 80 is moved to approach the battery array 25. The battery array 25 may be approached from its top side 90 so that additional side clearances between the end walls 60 and any surrounding obstructions (e.g., battery enclosures, packaging, internal battery components, etc.) are not necessary.

Next, the lifting tool 80 is used to engage one of the lifting features 64. The stationary leg 84 of the lifting tool 80 is first inserted into one of the through-holes 78 of the inner shell 68 of the end wall 60 to properly orient and align the lifting tool 80 relative to the end wall 60. The movable leg 86 may then be moved into the slot 76 at the same time using the engagement of stationary leg 84 in the through-hole 78 as a reactive force for the movement. For example, the movable leg 86 may be translated in a direction X (see FIG. 5A) or pivoted in a direction Z (see FIG. 5B) to position the engagement member 88 beneath the bent portion 74 of the tab 70. In either embodiment, it is not necessary to move any portion of the lifting tool 80 to a position that extends beyond the outer peripheral envelope of the battery array 25 in order to engage the lifting feature 64.

Finally, the body 82 of the lifting tool 80 can be moved in an upward direction D1 to lift and move the battery array 25 (best illustrated in FIG. 5C). Movement in the upward direction D1 causes the engagement member 88 to contact the underside 77 of the bent portion 74 of the tab 70, thereby creating the interference necessary to lift and move the battery array 25.

Figure 6:
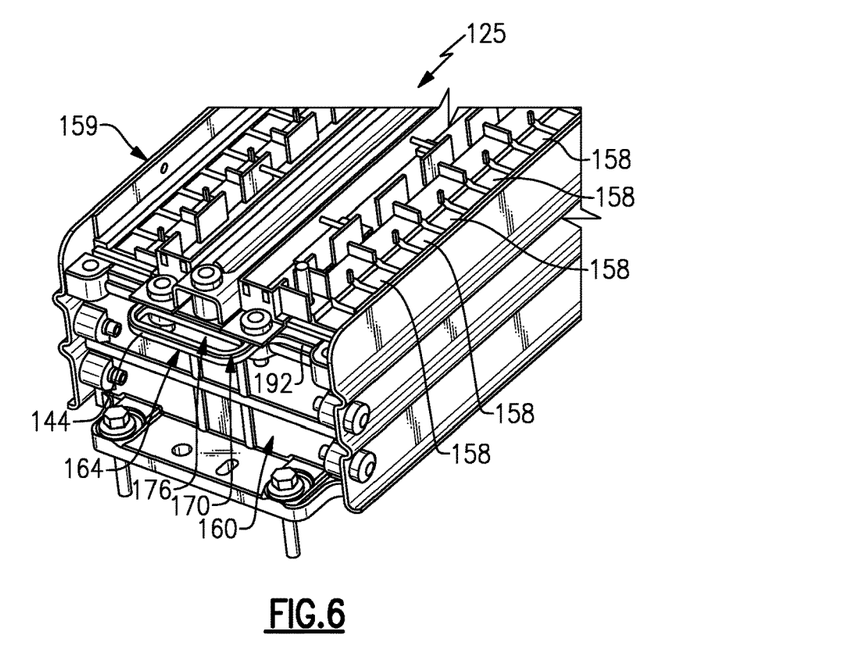
FIG. 6 illustrates a battery array according to another embodiment of this disclosure.
Figure 7:
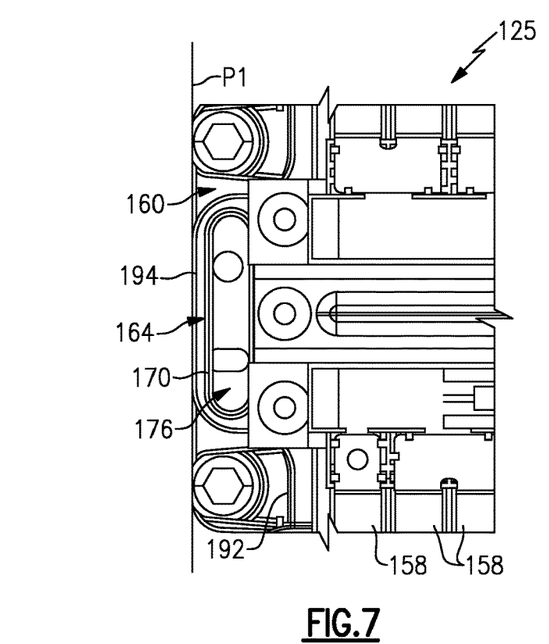
FIG. 7 illustrates a top view of a portion of the battery array of FIG. 6.

FIGS. 6 and 7 illustrate another exemplary battery array 125. In this disclosure, like reference numbers designate like elements where appropriate and reference numerals with the addition of 100 or multiples thereof designate modified elements that are understood to incorporate the same features and benefits of the corresponding original elements.

In this exemplary embodiment, the battery array 125 includes a plurality of battery cells 158, a support structure 159 that surrounds the plurality of battery cells 158, and one or more lifting features 164 that can be employed to lift, handle and maneuver the battery array 125. Each end wall 160 (only one shown) of the support structure 159 may include one of the lifting features 164. In one non-limiting embodiment, the end walls 160 exhibit a single-piece design and are cast, metallic parts.

The lifting feature 164 of each end wall 160 may include a tab 170 that is formed integrally with the end wall 160. The tab 170 may protrude outwardly from an outer face 192 of the end wall 160. The outer face 192 faces in a direction away from the battery cells 158. The tab includes a slot 176 that is configured to receive a portion of a lifting tool, as further discussed below. In one non-limiting embodiment, the tab 170 is located near the top of the end wall 160 to facilitate access to the lifting feature 164.

The tab 170 includes an outermost face 194. The outermost face 194 extends to a plane P1. The outermost face 194 is the outermost surface of the end wall 160. In other words, no other portion of the end wall 160 protrudes outwardly beyond the plane P1. Some other portions of the end wall 160 may, however, extend up to the plane P1.

Figure 8:
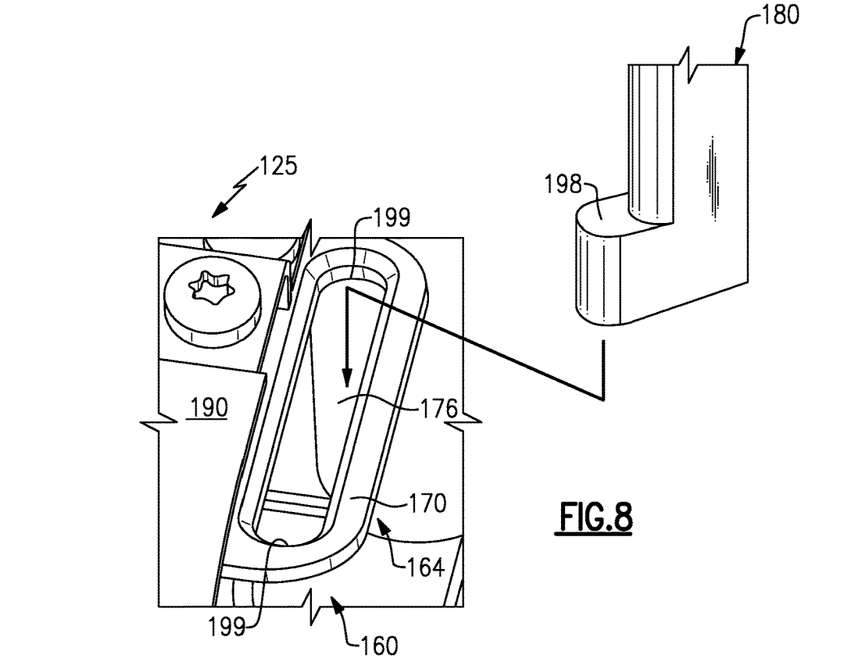
FIG. 8 schematically illustrates the use of a lifting tool to engage and move a battery array.

FIG. 8, with continued reference to FIGS. 6 and 7, illustrates use of a lifting tool 180 to engage and lift the battery array 125. First, the lifting tool 180 is moved to approach the battery array 125. The battery array 125 may be approached from its top side 190 so that additional side clearances between the end walls 160 and any surrounding obstructions (e.g., battery enclosures, packaging, etc.) are not necessary.

Next, the lifting tool 180 is moved to engage the lifting features 164. The lifting tool 180 may include a leg 198 that may be moved into the slot 176 and then under a portion of the tab 170 in order to engage the lifting feature 164. The leg 198 may engage any portion of the tab 170 that extends about the periphery of the slot 176. In one non-limiting embodiment, the lifting tool 180 engages curved ends 199 of the slot 176. Once the lifting feature 164 has been sufficiently engaged, the lifting tool 180 may be moved to lift and maneuver the battery array 125.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery array, comprising:
a plurality of battery cells positioned side-by-side along a longitudinal axis;
a support structure surrounding said plurality of battery cells; and
a first lifting feature protruding from an end wall of said support structure, wherein said end wall is disposed along said longitudinal axis at a longitudinal extent of said plurality of battery cells,
wherein said end wall includes an outer shell and an inner shell, and said first lifting feature includes a tab that protrudes from said outer shell,
wherein said inner shell includes at least one through-hole extending vertically through said inner shell.

2. The battery array as recited in claim 1, wherein a bent portion of said tab extends above said inner shell.

3. The battery array as recited in claim 1, wherein a retention bar extends over top of said plurality of battery cells and connects to said tab.

4. The battery array as recited in claim 3, wherein said tab and said retention bar together establish said first lifting feature.

5. The battery array as recited in claim 1, comprising a slot that extends between said tab and said inner shell.

6. The battery array as recited in claim 1, wherein said tab that protrudes outwardly from an outer face of said outer shell in a direction opposite from said plurality of battery cells.

7. The battery array as recited in claim 6, wherein said tab includes a slot.

8. The battery array as recited in claim 7, wherein said slot is configured to receive a lifting tool.

9. The battery array as recited in claim 6, wherein an outermost face of said tab is an outermost surface of said end wall.

10. The battery array as recited in claim 1, wherein said lifting feature includes a tab that is integrated as part of said support structure.

11. The battery array as recited in claim 1, comprising a second lifting feature protruding from a second end wall of said support structure, said second end wall on an opposite end of said plurality of battery cells from said end wall.

12. The battery array as recited in claim 1, wherein said first lifting feature includes a slot configured to receive a lifting tool.

13. The battery array as recited in claim 1, comprising a retention bar and a bus bar module extending over top of said plurality of battery cells.

14. The battery array as recited in claim 1, comprising a retention bar extending over top of said plurality of battery cells, and said retention bar is welded to a bent portion of said tab of said first lifting feature.

15. The battery array as recited in claim 1, wherein said outer shell is metallic and said inner shell is plastic.

16. The battery array as recited in claim 1, wherein said first lifting feature is stationary relative to said end wall.

17. A battery array, comprising:
a grouping of battery cells stacked side-by-side along a longitudinal axis;
a support structure including opposing end walls disposed along said longitudinal axis at longitudinal extents of said grouping of battery cells, opposing side walls between said opposing end walls, and a retention bar along a top of said grouping of battery cells;
a first lifting tab protruding from one of said opposing end walls, wherein a first bent portion of said first lifting tab is fixedly secured to said retention bar;
a second lifting tab protruding from the other of said opposing end walls, wherein a second bent portion of said second lifting tab is fixedly secured to said retention bar;
a first through-hole extending vertically through said one of said opposing end walls; and
a second through-hole extending vertically through said other of said opposing end walls;
wherein said first or said second through-hole is configured to receive a first portion of a lifting tool and said first or said second lifting tab is configured to receive a second portion of said lifting tool for lifting and moving the battery array.

18. A battery array, comprising:
a grouping of battery cells;

an end wall disposed at a longitudinal extent of said grouping of battery cells and including an outer shell and an inner shell;
a retention bar extending above said grouping of battery cells;
a stationary lifting tab protruding from said outer shell and including a bent portion secured to said retention bar; and
a through-hole extending vertically through said inner shell.

* * * * *